United States Patent [19]

Owen

[11] Patent Number: 5,453,842
[45] Date of Patent: Sep. 26, 1995

[54] IMAGE RECORDING APPARATUS

[75] Inventor: David P. Owen, Near Reading, England

[73] Assignee: Quantel Limited, Newbury, England

[21] Appl. No.: 967,746

[22] Filed: Oct. 28, 1992

[30] Foreign Application Priority Data

Sep. 9, 1992 [GB] United Kingdom ................ 9219050

[51] Int. Cl.⁶ ..................................................... H04N 5/84
[52] U.S. Cl. ............................ 358/350; 358/351; 348/199
[58] Field of Search .................................... 358/345, 346,
358/244, 244.1, 244.2, 54, 53, 350, 351,
352, 841, 332; 348/97, 199, 96, 98; H04N 5/84

[56] References Cited

U.S. PATENT DOCUMENTS

| 1,874,191 | 8/1932 | Ives .................................... 358/53 |
| 2,329,624 | 9/1943 | Kellogg ............................... 358/346 |
| 4,740,820 | 4/1988 | Endo .................................... 355/20 |
| 4,754,334 | 6/1988 | Kriz et al. ........................... 358/244 |
| 4,780,756 | 10/1988 | Shiota et al. ...................... 358/244 |

FOREIGN PATENT DOCUMENTS

| 1316935 | 5/1973 | European Pat. Off. ....... G03B/27/52 |
| 8701891 | 3/1987 | European Pat. Off. .......... H04N/1/46 |
| 0226115 | 6/1987 | European Pat. Off. ........ H04N/13/00 |
| 0278664 | 8/1988 | European Pat. Off. .......... H04N/5/64 |
| 2207772 | 2/1989 | United Kingdom .......... G03B/21/134 |

OTHER PUBLICATIONS

English–language Abstract of Japanese Laid-Open Application No. 1040338, *Patent Abstracts of Japan*, vol. 13, No. 225 (M–830), May 25, 1989.

Primary Examiner—Tommy P. Chin
Assistant Examiner—Huy Nguyen
Attorney, Agent, or Firm—Cooper & Dunham

[57] ABSTRACT

An image recording apparatus comprises a store for storing data representing an image, a cathode ray tube for displaying the image represented by the data in raster scan order and a camera for directing the displayed image onto film. A movable mask is positioned in front of the screen of the cathode ray tube. The mask defines an aperture which is moved over the screen of the tube as the image is displayed thereon so as to prevent unwanted light caused by the displaying of the image from being directed onto the film.

13 Claims, 5 Drawing Sheets

IMAGE RECORDING APPARATUS

FIELD OF THE INVENTION

The invention relates to an image recording apparatus and to a method of recording an image on photographic film.

DESCRIPTION OF THE RELATED ART

Electronic image processing apparatus is now widely used to modify images. Electronic graphics systems enable the painting or drawing of an image to be simulated and enable the merging of one image into another. Electronic graphics systems thus allow an original image to be generated or an initial image to be modified, for example by re-touching portions of the image, wholly within an electronic environment. Other image processing systems enable an image to be transformed so that for example its position in three dimensional shape appears to alter or the image appears to be applied to the surface of an object.

Images are represented electronically as an array of data defining respective image elements, or pixels. The pixel data may be generated internally by the system, as in the case where an image is painted, or it may be extracted from another medium, as in the case where an image on say a film is scanned electronically. Once an image has been created, modified and/or transformed to the satisfaction of the user of the system, the pixel data can be output through an output device which applies the image defined by the data to a medium such as paper or film. Printers can be used to transfer the image to paper, film, etc., and image recorders can be used to transfer the image to photographic film or other light sensitive media.

Image recorders are used in the movies industry to transfer modified movie frames back onto film on a frame-by-frame basis. A schematic diagram of a typical image recorder is shown in FIG. 1 of the accompanying drawings. Referring to FIG. 1, an image recorder system 1 comprises a store 2 for storing data representing pixels of an image. Typically, the image may be defined by 2800×2048 pixels, though of course larger or smaller images may instead be defined by the data in the store 2. Data is scanned from the store 2 a row at a time under the control of an x, y address scanner 3. The data scanned from the store 2 is applied to a digital-to-analog converter 4 which converts it to a signal which is applied to a cathode ray tube 5. The cathode ray tube 5 also receives x, y address signals from the scanner 3 thereby causing the beam to scan across the screen 6 of the cathode ray tube 5 in synchronism with the scanning of the data from the store 2. The recorder system 1 further comprises a camera 7 having a filter 8 and a lens 9 which focuses the image displayed on the screen 6 onto a film 10.

In use, the electronic image is scanned three times onto the screen 6, one for each red, green and blue separation with the appropriate filter placed over the lens 9 during each scan. It typically takes about 30 seconds to scan each separation and thus takes about three times that period to scan the whole image onto the film 10. Once an image has been transferred to the film 10, new image data can be written into the store 2 and the film 9 advanced in the camera 7 in readiness for the scanning of the next processed image frame. One type of image recorder presently available is the "Solitaire" recorder by Management Graphics Inc.

There is a problem associated with image recording apparatus as described hereinabove, namely that of so-called haloing which occurs as a result of internal reflection in the screen 6 of the cathode ray tube 5. Turning now to FIG. 2 of the accompanying drawings, there is shown a cross section through the screen 6 of a cathode ray tube. The screen 6 comprises a face plate 11 having deposited on one face a phosphor layer 12. In use, the phosphor layer 12 is excited by a scanning electron beam 13 causing the phosphor to emit light through the face plate 11. Most of the light passes through the face plate 11 and, as shown in FIG. 3, is seen as a dot of light 14 on the screen 6. However, a significant proportion of the emitted light is reflected internally in the face plate 11 before passing out of the same. As shown in FIG. 2, the majority of the reflected light 15 is reflected back out through the face plate and this primary reflection is seen as a halo 16 on the screen 6 (see FIG. 3). The size of the halo 16 caused by the primary reflections 15 depends on the physical thickness and the constitution of the face plate 11 but typically will have a radius of about 15 mm. In addition to the halo caused by the primary reflections there is an overall uplifting of the level of light seen on the screen caused by secondary reflections 17 where the light is reflected several times internally before passing out through the face plate.

The halo 16 is an area of illumination on the screen where there should be none and it will be appreciated that as the dot 14 is scanned across the screen 6 the halo 16 will move with it. Thus, in addition to a point or dot of light being directed as an image onto a corresponding point or dot on the film, the halo image causes the corresponding area of film to become fogged. As the halo moves across the screen the whole of the image frame on the film will become fogged thereby. The degree of fogging of the image on the film depends on the mean brightness of the electronic image represented by the pixel data in the store 2. The effect of fogging is to increase the overall brightness of the image on the film so that areas which should be black in fact appear as grey.

SUMMARY OF THE INVENTION

According to one aspect of the present invention there is provided an image recording apparatus comprising a raster scan display means for displaying an image defined by electronically stored data, a means for focusing the displayed image onto a photographic film and masking means associated with the display means for masking portions thereof to prevent unwanted light caused by the displaying of the image from being focused onto said film.

According to another aspect of the invention there is provided a method of recording an image on photographic film, the method comprising converting electronically stored data representing the image into a signal and applying the signal to a raster scan display so that the image is displayed in a scan sequence thereon, focusing the displayed image onto the photographic film thereby recording the image thereon, and masking portions of the scan displayed image to prevent unwanted light caused by the displaying of the image from being focused onto said film.

The invention also provides a device for use in an image recording apparatus in which electronic data representing an image is used to drive a scanning display to display the image with a photographic film being exposed to the displayed image in order to record the image on said film, the device comprising movable masking means positionable over the scanning display so as to allow only a portion of the image to pass therethrough and positioning means for positioning the masking means on the display, the positioning means being arranged to synchronise the positioning of the masking means with the scanning of the image on the display means.

Furthermore, the invention provides an apparatus for transferring an image defined as electronic signals onto a light sensitive medium, the apparatus comprising a raster scan display responsive to said electronic signals for displaying the image represented thereby in a raster scan sequence, a movable mask having an aperture and being arranged to move over the display such that the aperture is moved substantially in synchronism with the scanning of the image, and means for directing the displayed image passing through said aperture onto said light sensitive medium.

The above and further features of the invention are set forth with particularity in the appended claims and together with advantages thereof will become clearer from consideration of the following detailed description of an exemplary embodiment of the invention given with reference to the accompanying drawings.

DESCRIPTION OF THE PREFERRED EMBODIMENTS

Figure 1:
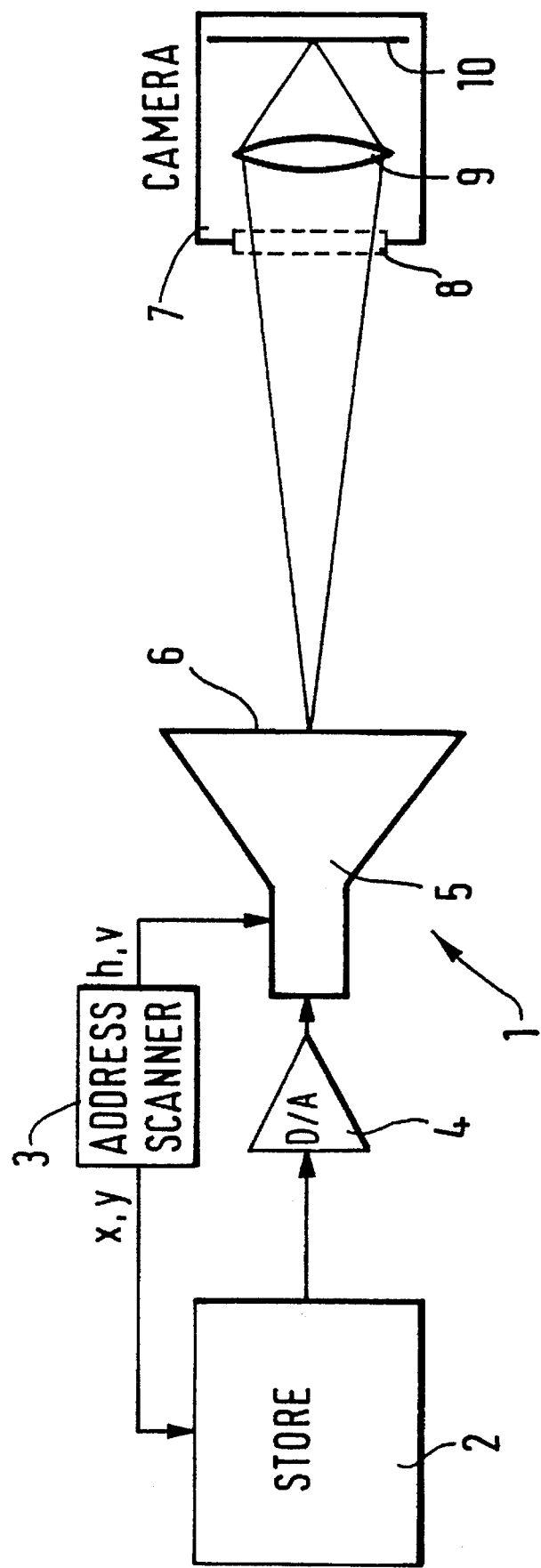
FIG. 1 is a schematic diagram of a known image recorder, as described hereinabove.
Figure 2:
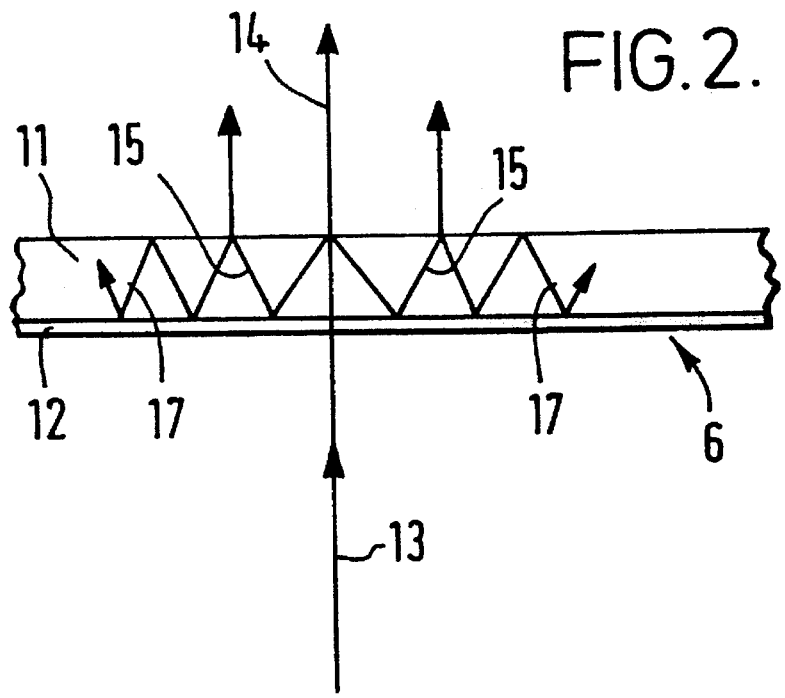
FIG. 2 is a schematic cross section through the screen of a cathode ray tube, as described hereinabove.
Figure 3:
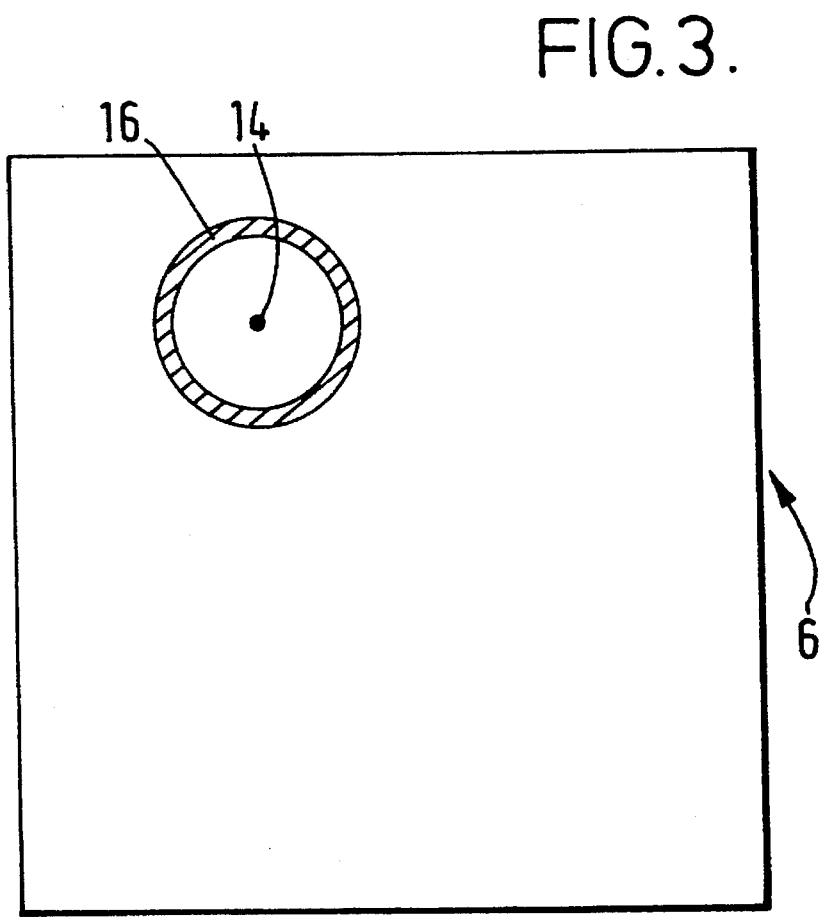
FIG. 3 is a schematic view of the screen of FIG. 2, as described hereinabove.
Figure 4:
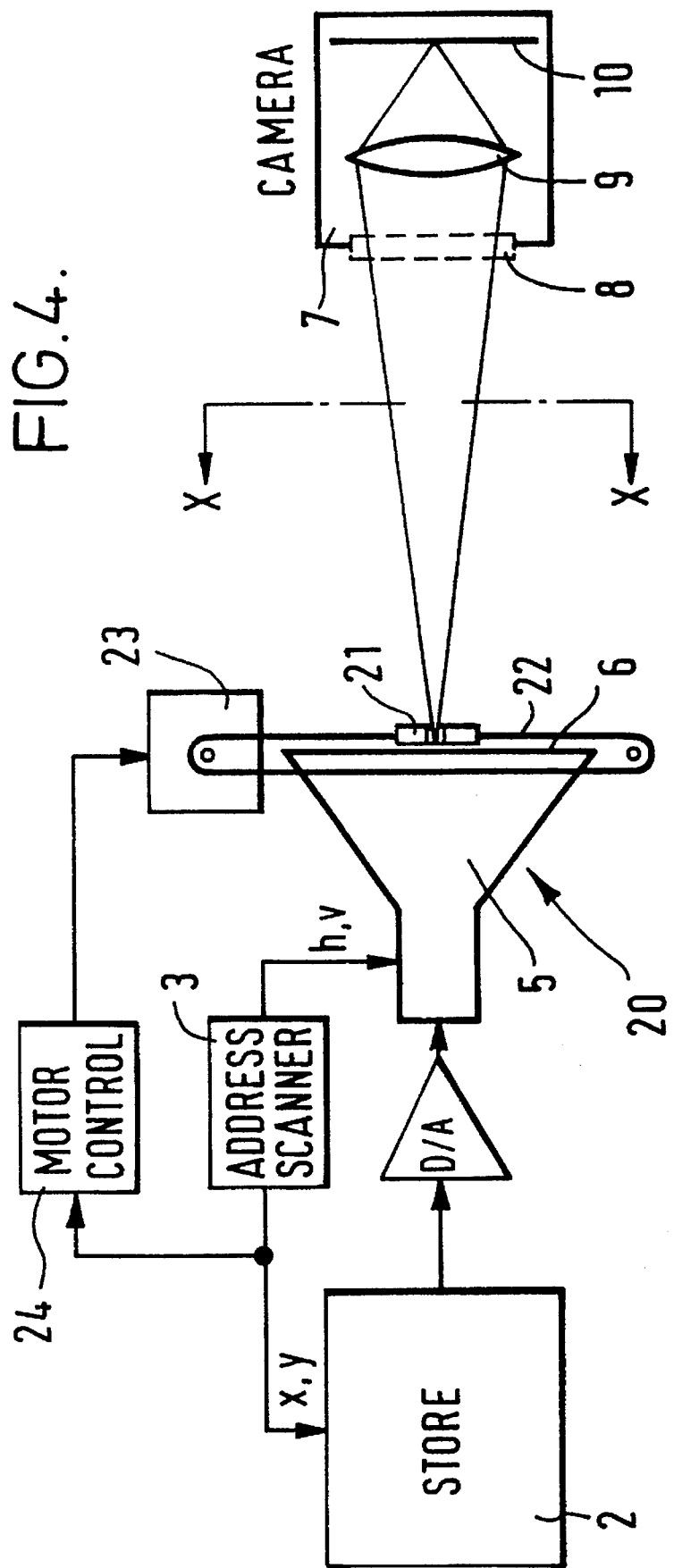
FIG. 4 is a schematic diagram of an image recorder embodying the invention.

Turning now to FIG. 4 of the accompanying drawings an image recorder system 20 embodying the invention is shown. In FIG. 4 parts of the image recorder system 20 which are identical to corresponding parts of the image recorder system 1 of FIG. 1 are designated by the same legend as in FIG. 1. Reference is made to the description of those parts common to both recorder systems. The recorder system 20 further comprises a travelling mask 21 positioned over the screen 6 of the cathode ray tube 5. The mask 21 is mounted to a conveyer 22 which is driven by a servo motor 23 controlled by a motor control unit 24 coupled to the address scanner 3.

Figure 5:
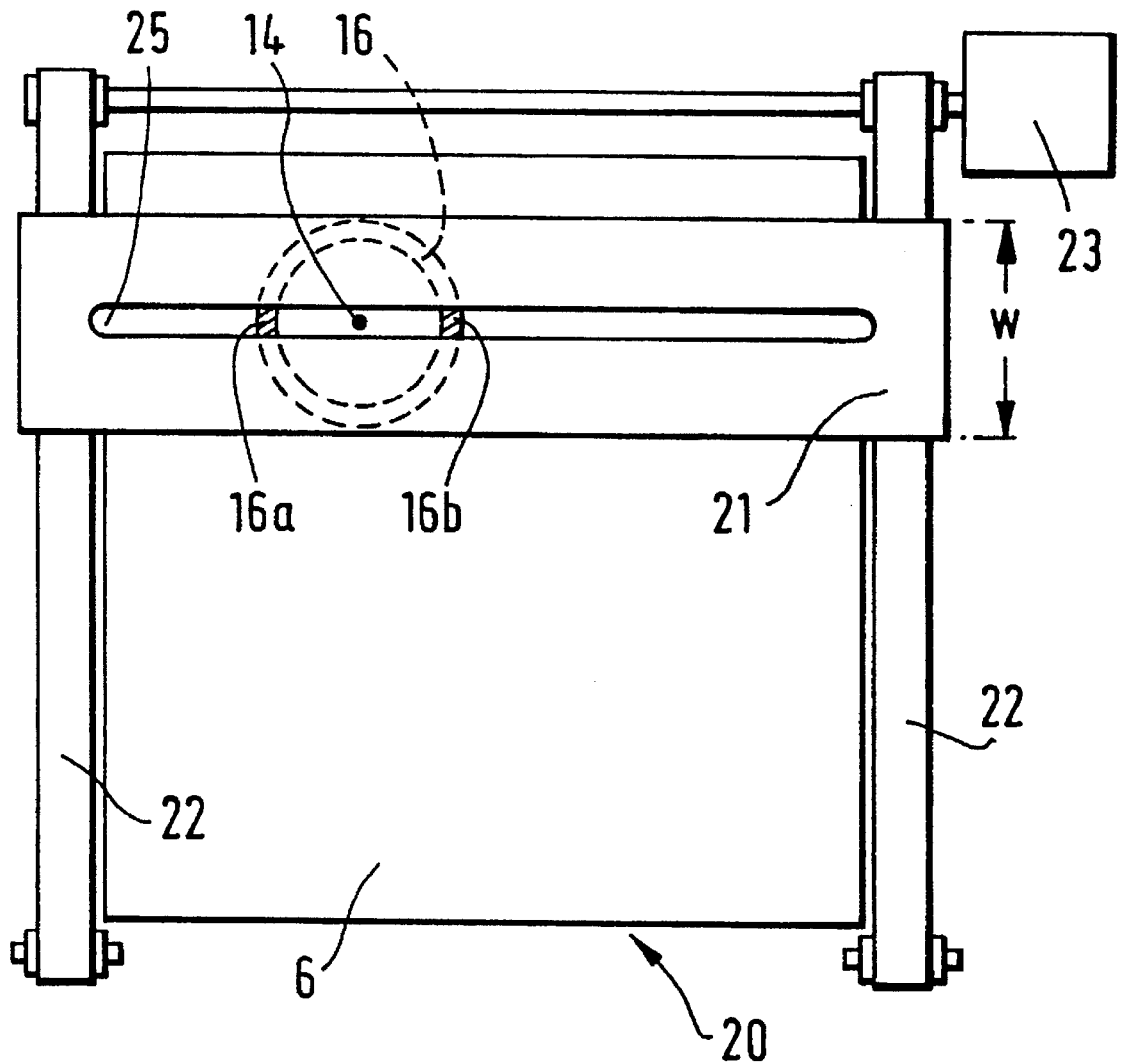
FIG. 5 is a schematic plan view of the image recorder of FIG. 4 viewed in the direction x—x.

FIG. 5 shows a schematic plan view of the recorder system 20 viewed in the direction of arrows x—x in FIG. 4. As can be seen from FIG. 5, the mask 21 defines an elongate aperture or slot 25 and has a width at least equal to the diameter of the halo 16. The control unit 24 (see FIG. 4) is arranged to synchronise movement of the mask 21 over the screen 6 with the reading of pixel data from the store 2 and display of corresponding pixels on the screen 6. The slot 25 has a length at least equal to the length of a line in the image as displayed on the screen and the mask 21 moves over the screen 6 as successive lines in the image are scanned. It will be appreciated that the effect of the mask is to blank out most of the halo 16 thereby preventing it from being seen by the camera 7.

The exact size of the slot 25 depends on the optical geometry of the system 20. Ideally, the slot would be of a width corresponding to that of a single line as displayed on the screen 6, i.e. the diameter of the dot of light 14. However, it is not possible to achieve this in practice because of the difficulty in machining such a narrow slot and because of the limitation in the accuracy of positioning the servo motor. Furthermore, the mask must be positioned out of contact with the screen 6 in order to avoid damage to the screen and is of finite thickness. The slot 25 must be wide enough to allow the light from the dot 14 to pass therethrough to the camera 7.

A slot 3 mm wide defined in a mask positioned 1 mm above the screen 6 has been found to be acceptable in a recorder system where the lens of the camera is approximately 250 mm away from the screen. Such a slot has a width corresponding to several image lines and thus the degree of accuracy required in positioning the slot in relation to the line currently being scanned is not great. Whilst such a slot allows portions 16a, 16b of the halo 16 to pass therethrough the fogging effect of these portions 16a, 16b is relatively insignificant.

Figure 6A:
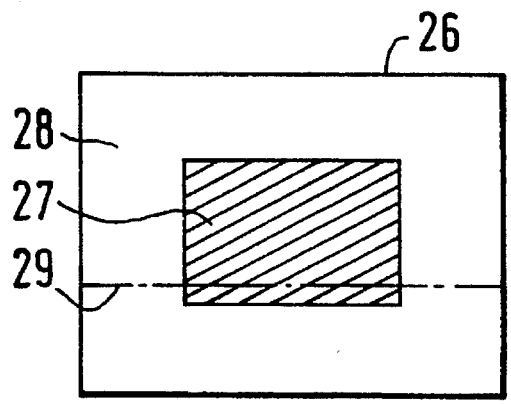
FIGS. 6(a)–6(f) illustrates exemplary images and the density in images obtained using the systems of FIG. 1 and FIG. 2.

An advantage of using a slotted mask 21 will now be explained with reference to the graphs shown in FIGS. 6(a)–6(f) of the accompanying drawings. FIG. 6(a) shows an image 26 comprising a large area 27 of black on a background 28 of white. For the purpose of illustration it is assumed that the area 27 has a maximum value of black and that the background 28 has a maximum value of white. FIG. 6(b) shows a graph of image density along a line 29 in the image 26. The image 26 has a maximum density at positions on the line 29 which lie within the area 27 and a minimum density at positions on the line 29 which lie within the background 28. The broken-line plot 30 in FIG. 6(b) represents the ideal image density situation, zero density in the background 28 and maximum in the area 27. The continuous-line plot 31 represents the density of the image transferred to film using the known system 1 shown in FIG. 1. The effect of the halo is to reduce the density of the image on film so that the area on the film appears to be less black, i.e. greyer, than it should be. In other words, the overall brightness of the image on film is raised and the contrast between maximum black and maximum white is reduced.

Figure 6C:
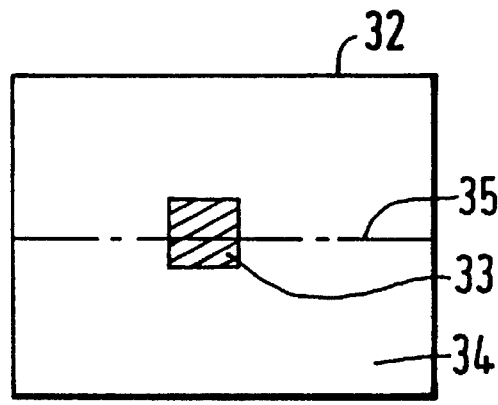
Figure 6B:
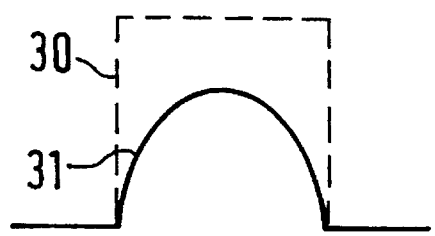
Figure 6D:
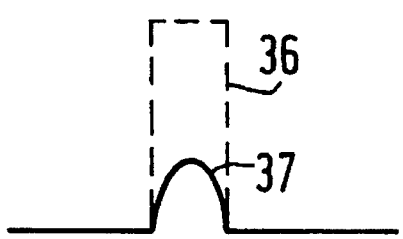

FIG. 6(c) shows a second initial image 32 comprising a smaller area 33 of black on a background 34 of white and FIG. 6(d) is a graph of image density along a line 35 in the image 32. In FIG. 6(d) a broken-line plot 36 represents the ideal situation of maximum density within the area 33 and zero density outside the area 33. The image density in an image transferred to film using the known system 1 of FIG. 1 is represented by a continuous-line plot 37 in FIG. 6(d). It will be seen that the maximum value of image density in plot 36 is considerably less than the ideal of plot 35 and indeed is less than the maximum of plot 31 in FIG. 6(b). This reduction in plot 36 as compared to plot 31 is due to the increase in the size of the background as between image 26 and image 32. An increase in the size of the white background results in the halo being displayed on the screen of the cathode ray tube 5 in the known system 1 for a greater period of time and thus a greater degree of fogging occurs in the black area 33. In general, the degree of fogging in an image is proportional to the mean brightness of the image using the known system 1.

Figure 6E:
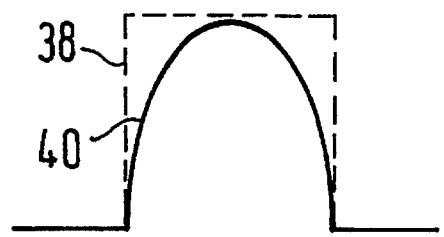
Figure 6F:
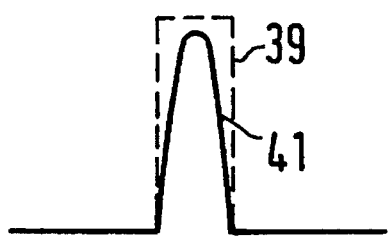

FIGS. 6(e) and 6(f) show graphs, similar to those in FIGS. 6(b) and 6(d), for images transferred to film using the system 20 of FIGS. 4 and 5. Again the ideal situation of maximum density in areas corresponding to areas 27 and 33 are shown by broken-line 38 and 39 respectively. A continuous-line plot 40 represents the density in the image 26 transferred to film using the system 20 and continuous-line plot 41 represents the density in the image 32 transferred to film using the system 20. The maximum density values in plots 40 and 41 are not reduced significantly, if at all, from the ideal maximum because in the system 20 most of the halo 17 which causes fogging is blanked out by the mask 21.

In the above described system 20 the mask 21 is an elongate member in which is defined a slot 25 at least equal in length to that of an image line. It will be appreciated by those possessed of the appropriate skills that the mask 21 could be replaced by a mask only slightly greater in size than the halo 16 and having a circular aperture at the center of the mask. Such a mask would move over the screen with the point of light as the image was scanned. However, in practice such an arrangement would be complex to implement since the mask would need to be moved both from one side to the other of the screen and from top to bottom. Furthermore, the main advantage in using such an arrangement would be to blank out portions 16*a* and 16*b* of the halo but since the contribution of these portions to fogging is very little, the overall improvement in image density as compared to that using an elongate slot mask would be minimal.

Furthermore, having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. An image recording apparatus comprising:
   a raster scan display screen for displaying an image defined by electronic data, the display screen being arranged to display the image over a period of time by the scanning of a point of light over the display screen;
   a focusing means for focusing the image displayed on the display screen onto a photographic film;
   a masking means placed over the display screen, the masking means comprising a moving plate having an aperture; and
   a positioning means for positioning the aperture over the point of light during said scanning to allow said point of light to pass through the aperture and to prevent unwanted light caused by the displaying of the image on the display screen from being focused onto said film,
   wherein the display screen comprises a multiplicity of scan lines over which the point of light is scanned and the aperture comprises an elongate slot disposed substantially parallel to said scan lines having a length at least equal to that of a scan line and a width which limits the light transmitted therethrough mainly to the scan line being traversed by the light.

2. An apparatus as claimed in claim 1, wherein the focusing means further comprises filtering means to enable different color separations to be focused individually onto said film.

3. An apparatus as claimed in claim 1, further comprising a framestore having a multiplicity of storage locations for storing said electronic data.

4. An apparatus as claimed in claim 3, wherein the positioning means comprises an address scanner for generating horizontal and vertical scanning signals for controlling the scanning of the point of light over the display screen and for generating corresponding address signals for addressing storage locations in said framestore.

5. An apparatus as claimed in claim 4, wherein the positioning means further comprises:
   a servo motor coupled to the masking means for moving the same over the display screen; and
   controlling means connected to the servo motor and to the address scanner and responsive to said address signals for synchronizing the location of the masking means with the scanning of the point of light over the display screen.

6. A device for use in an image recording apparatus in which electronic data representing an image is used to drive a scanning display to display the image with a photographic film being exposed to the display image in order to record the image on said film, the device comprising:
   a movable mask positionable over the scanning display so as to allow only a portion of the image from the display to pass through the mask, the mask comprising a plate having an aperture; and
   a mechanism for positioning the mask on the display, the mechanism being arranged to synchronize the positioning of the aperture with the scanning of the image on the scanning display so as to confine the light passing through the mask to a limited region including the point of the image currently being scanned,
   wherein the scanning display comprises a multiplicity of parallel scan lines and the aperture comprises an elongate slot parallel to said scan lines and having a length at least equal to that of said scan lines on the display.

7. A device as claimed in claim 6, wherein the mechanism comprises a servo motor and a control circuit for driving the servo motor, the control circuit being connectable to the scanning display for synchronizing the positioning of the mask with the scanning of the image on the scanning display.

8. A device as claimed in claim 6, wherein the mechanism comprises a servo motor and a control circuit for driving the servo motor, the control circuit being connectable to the scanning display for synchronizing the positioning of the mask with the scanning of the image on the display.

9. An apparatus for transferring an image defined as electronic signals onto a light sensitive medium the apparatus comprising:
   a raster scan display responsive to said electronic signals for displaying the image represented thereby in a raster scan sequence, the raster scan display having a display plane in which said image is displayed;
   a movable mask having an aperture and being positioned substantially at the display plane;
   a mechanism for moving the mask over the display such that the aperture is moved substantially in synchronism with the scanning of the image on the display; and
   optics for directing the displayed image passing through said aperture onto said light sensitive medium,
   wherein the raster scan display comprises a multiplicity of parallel scan lines and said aperture comprises an elongate slot having a length at least equal to that of a scan line on the display, and the mask is moved substantially in synchronism with the scanning of said lines in the display.

10. An apparatus as claimed in claim 1, wherein said light sensitive medium comprises a photographic film.

11. An apparatus as claimed in claim 1, further comprising a store for storing said electronic signals defining said image in a multiplicity of storage locations.

12. An apparatus as claimed in claim 11, further comprising addressing means for generating horizontal and vertical scanning address signals for control of the raster scan display, and corresponding address data for addressing storage locations in said store.

13. An apparatus as claimed in claim 12, wherein the means for moving the mask comprises a motor and associated control circuitry responsive to the address data from the addressing means for driving the mask substantially in synchronism with the scanned point of the scanned point of the display.

* * * * *